3,411,812
FLARED FITTING SEAL

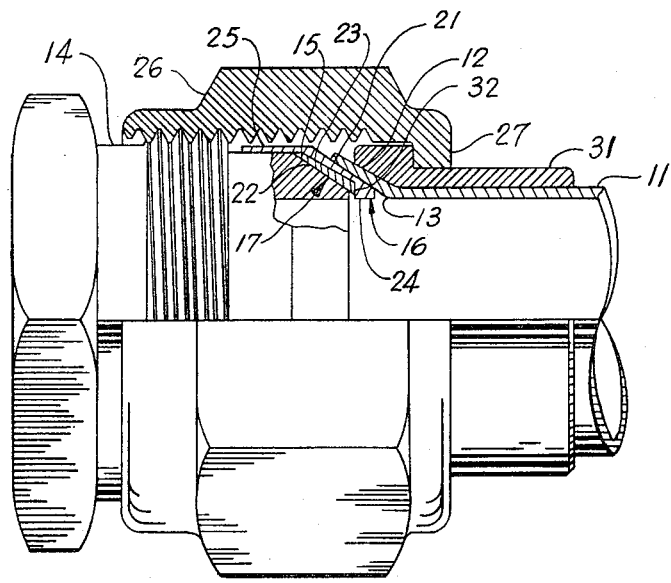
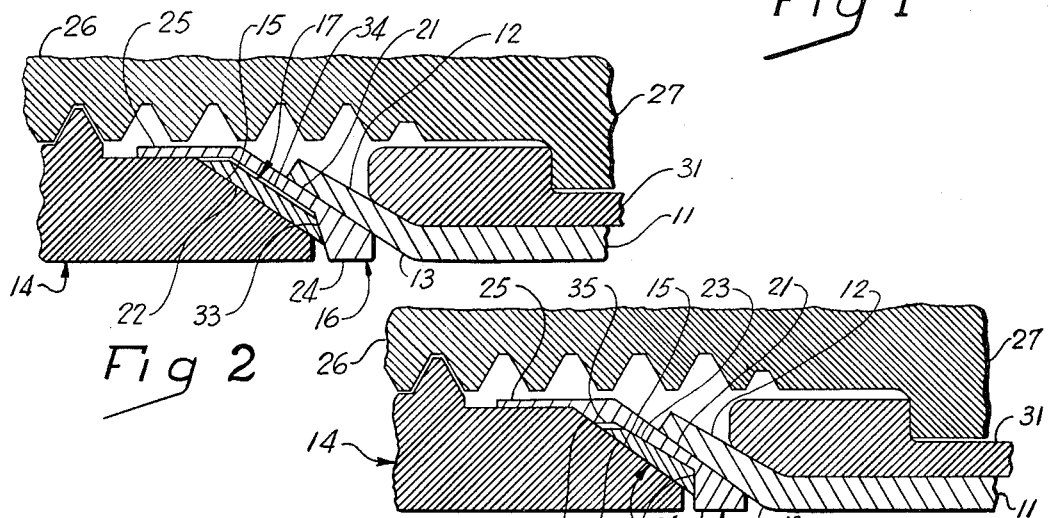
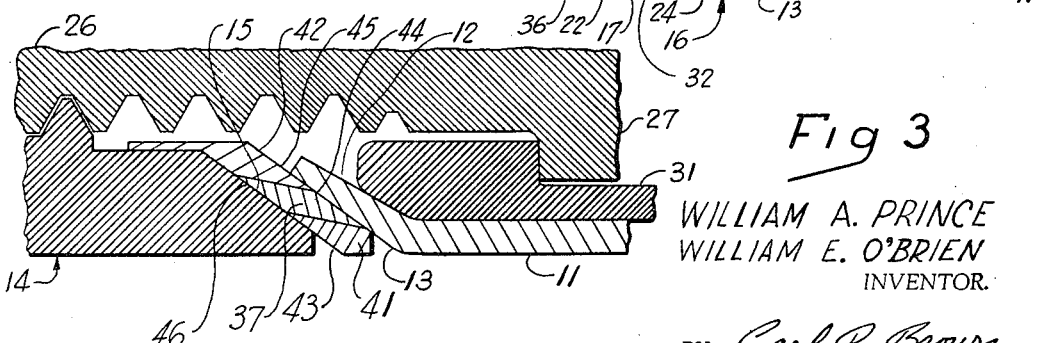
Fig 1
Fig 2
Fig 3
Fig 4
WILLIAM A. PRINCE
WILLIAM E. O'BRIEN
INVENTOR.

William A. Prince, North Haven, Conn., and William E. O'Brien, La Mesa, Calif., assignors to General Dynamics Corporation, San Diego, Calif., a corporation of Delaware
Filed Dec. 29, 1964, Ser. No. 421,943
5 Claims. (Cl. 285—187)

This invention relates to flared tube fittings, and more particularly to a seal adapted for use in a flared tube fitting which seals the fitting against leakage of fluids at high and low temperatures and pressures.

Flared tube fittings, as well known in the art, are extensively employed in hydraulic and pneumatic systems. In attempting to extend the use of flared tube fittings to encompass low molecular weight gases, such as hydrogen and helium, at cryogenic or elevated temperatures and high or low pressures, the leakage problem has become acute. Attempts to solve this leakage problem, employing gasket-like crushable sealing washers or extremely smooth finishes on mating parts, have not been satisfactory.

The flared tube fitting seal of the present invention comprises two nested frusto-conical members made of dissimilar metals placed between the nose cone of the fitting and the inner portion of the tube flare. As the coupling nut is tightened, the inner of the two nested members is radially expanded over the fitting nose cone by the compression of the outer nested member. An elastic spring action results between the tube flare and the fitting nose cone.

The interface between the inner member and the fitting nose cone has an inclined surface which, combined with the differing thermal contraction characteristics of the inner member and fitting, results in the seal being maintained despite subjection of the fitting to cryogenic temperatures. Similarly, the interface between the inner and outer members has an inclined surface which, combined with the differing thermal expansion characteristics of the inner and outer members, results in the seal being maintained despite subjection of the assembly to elevated temperatures.

It is, therefore, an object of this invention to provide a flared tube fitting seal which prevents gas leakage at high and low temperatures and pressures.

Another object of this invention is to provide a flared tube fitting seal which improves its sealing characteristics at extreme temperatures and pressures.

Another object of this inventon is to provide a flared tube fitting seal fabricated of materials having differing thermal expansion characteristics.

Another object of this invention is to provide a flared tube fitting seal having an energy-storing spring characteristic.

Other objects and advantages of the present invention will become apparent from the following description and accompanying drawing, wherein:

FIGURE 1 is a partially cut away drawing of a conventional flared tube fitting incorporating one embodiment of the present invention;

FIGURE 2 is a detail cross-sectional view of a second embodiment of the present invention;

FIGURE 3 is a detail cross-sectional view of a third embodiment of the present invention; and, FIGURE 4 is a detail cross-sectional view of a fourth embodiment of this invention.

Referring now to FIGURE 1, a tube 11, forming part of a fluid system, has a flared end portion 12 with a frusto-conical inner face 13. In the high pressure, extreme temperature systems wherein the present invention is most useful, tube 11 is preferably fabricated of stainless steel.

A union 14, having a bore coaxial with the bore of tube 11, is provided at the end with a nose cone in the form of a frusto-conical seat 15 which is fabricated substantially at the same angle as the inner face 13 of Flare 12.

In the usual fitting heretofore known to the art, seat 15 mated with inner surface 13 of flare 12 to provide the sealing surface. In the present invention a gasket comprising an outer ring 16 and an inner ring 17 is provided, fitting between inner surface 13 of flare 12 and seat 15 of union 14. Outer face 21 of outer ring 16 mates with inner surface 13 of flare 12, and inner face 22 of inner ring 17 mates with seat 15. Interface 23 between inner ring 17 and outer ring 16 is angled with respect to inner face 21 and outer face 22 so that inner ring 17 is thicker at the edge adjacent the tube bore than at the edge adjacent the outside of the fitting. Conversely, outer ring 16 is thicker at the edge adjacent the outside of the fitting than at the edge adjacent the tube bore. Outer ring 16 is also furnished with a flat face 24 parallel to the tube bore, and a sleeve 25 slidingly fitting on the outside of union 14. The flared tube fitting also includes a nut 26 internally threaded to mate with union 14 and having a collar portion 27 adapted to slidingly fit with sleeve 31 on tube 11, as is well known in the art.

The inner ring 17 and seat 15 of fitting 14 cooperate to form a ring spring. As is well known in the art, ring springs are employed where it is necessary to absorb a large amount of energy in a small space. Such springs comprise a series of inner and outer rings alternately arranged with mating conical surfaces to form a column. When an axial load is applied, the spring is compressed by radial expansion of the outer rings and compression of the inner rings. Since stress distribution in a ring spring is substantially uniform, it can absorb and store more energy per weght or volume of material than other type of spring.

In the present invention, tightening nut 26 draws up sleeve 31 and inner surface 13 of flare 12 toward seat 15. Inner surface 13 of flare 12 forces outer ring 16 against surface 32 of inner ring 17, in turn axially forcing inner inner ring 17 onto seat 15, expanding inner ring 17 and storing energy. Upon releasing nut 26, the ring 17 returns to its original shape. The unloading portion of the cycle represents the spring restoring force that, along with the contact area, determines the sealing pressure.

Sealing surfaces 21, 22 and 23 may be conveniently plated or coated with a sealing material such as silver or a fluorocarbon synthetic resin such as "Teflon" to reduce friction and lower the necessary sealing pressure.

To enable utilization of differential thermal contraction or expansion of materials for maintaining the sealing pressure through both low and high temperature extremes, the inner ring 17 is fabricated of a metal having a relatively high thermal coefficient of expansion and outer ring 16 of a metal having a relatively low thermal coefficient of expansion. In a high strength fitting wherein the union 14, nut 27 and tube 11 are of stainless steel, inner ring 17 may be fabricated of a high strength aluminum alloy, such as that known as 6061–T6 aluminum alloy. Outer ring 16 is fabricated of a stainless steel similar to that of the fitting.

Upon cooling, as by a cryogenic fluid, of the assembled fitting, including the seal of the present invention, differential thermal contraction shrinks inner ring 17 over the seat 15 and forces it against outer ring 16 at surface 32. The axial component of this force maintains and boosts the sealing pressure on surface 32, face 21, and face 22.

Upon warming to high temperatures, aluminum inner ring 17 expands faster than the steel outer ring. This differential expansion results in a greater increase of the diameter of aluminum inner ring 17 than of the steel outer ring 16 and of the steel fitting. Outer ring 16 tends to move outward radially, but is restrained by the flare 12, seat 15 and the wedging action of the inclined plane of interface 23 between outer ring 16 and inner ring 17. This action again forces the inner ring 17 against the outer ring 16, and due to the inclined surface 23, maintains or boosts the sealing pressure on faces 21, 22 and surface 23.

Sealing is also aided by the pressure differential between the ambient and the fluid pressure inside the fitting. As pressure is applied to the system including the fitting, a radial force is applied to flat face 24 of outer ring 16 by the fluid. This radial force results in a wedging action of outer ring 16 between surface 32 and inner surface 13 of flare 12.

A second embodiment of this invention, illustrated by FIGURE 2, includes a short inclined interface 33 between outer ring 16 and inner ring 17. In this embodiment, interface 34 between outer ring 16 and inner ring 17 is parallel to inner flare surface 13 and to seat 15 of union 14, and may be spaced. In this embodiment, wedging action at interface 33 maintains sealing pressure at interface 33 despite temperature extremes. At low temperatures, aluminum inner ring 17 contracts more than the steel union 14, tending to slide downward on seat 15. At high temperatures, the greater expansion of aluminum ring 17 is constrained by steel outer ring 16, again applying sealing pressure on interface 33.

The embodiment of FIGURE 3 is similar to that of FIGURE 1 except that outer ring 16 is fabricated with a shoulder 35 seated on seat 15, providing a sealing interface 36 in addition to sealing surface 22. Such structure limits the possible leakage paths to two, one on each side of outer ring 16. Otherwise, the embodiment of FIGURE 3 is similar in structure and operation to the embodiment of FIGURE 1.

In the embodiment of this invention illustrated in FIGURE 4, an aluminum alloy control ring is nested with a stainless steel inner ring 41 and a stainless steel outer ring 42. When cooled down to cryogenic temperatures, aluminum central ring 37 contracts more than steel rings 41 and 42. The contracted aluminum ring 37 slides down and tends to wedge with inner steel ring 41, forcing surface 43 of steel ring 41 against seat 15, and surface 44 of aluminum ring 37 against surface 13 of flare 12. Oppositely, as temperatures are elevated, aluminum ring 37 expands more than steel ring 42, tending to wedge face 45 of steel ring 42 against surface 13 of flare 12, and surface 46 of aluminum ring 37 against seat 15.

Since the actual differential motions of the seal elements are very slight, they may be brazed or welded together, or may be encapsulated with a thin coating of a suitable synthetic resin as, exemplarily, a fluorocarbon resin.

While certain preferred embodiments of this invention have been specifically disclosed, it is understood that the invention is not limited thereto since many variations will be readily apparent to one skilled in the art and the invention is to be limited only by the terms of the following claims.

What we claim is:

1. In a flared tube coupling having a frusto-conical seat cooperating with a flared tube end,
   a seal between said seat and said flared tube end comprising,
   an outer circumferentially continuous ring in engagehigh thermal coefficient of expansion in engagement with said seat,
   an outer circumferentially continuous ring in engagement with said flared tube end having a lower thermal coefficient of expansion than that of said inner ring which is comparable to that of the coupling adjacent said flared tube end,
   an inclined interface between said inner ring and said outer ring,
   said rings being in engagement along said inclined interface, and
   means for maintaining said coupling, said tube end and said seal in assembled sealing relationship,
   and abutment means on said outer ring engaging said inner ring and maintaining said inner ring in hoop tension.

2. In a flared tube coupling having a frusto-conical seat cooperating with a flared tube end and having a screw means for assembling and forcing said flared tube toward said seat,
   a seal between said seat and said flared tube end comprising an inner frusto-conical circumferentially continuous metallic ring having a relatively high thermal coefficient of expansion,
   an inner face and an outer face on said inner ring,
   said inner face on said inner ring in engagement with said seat,
   an outer frusto-conical circumferentially continuous metallic ring having a relatively low thermal coefficient of expansion compared to said inner ring,
   said outer ring having an inner face and an outer face,
   said inner face of said outer ring in engagement with the outer face of said inner ring and said outer face of said outer ring in engagement with said flared tube end,
   said outer ring having a thickened section at its inner circumference engaging the inner circumferential edge of said inner ring,
   whereby tightening said coupling forces said flared tube end toward said seat compressing said inner and outer rings therebetween causing said outer ring to force said inner ring to move up the inclined surface of said seat.

3. In a flared tube coupling having a frusto-conical seat cooperating with a flared tube end and having screw means for assembling and forcing said flared tube end toward said seat,
   a seal between said seat and said flared tube end comprising an inner frusto-conical circumferentially continuous metallic ring having a relatively high thermal coefficient of expansion,
   an inner face and an outer face on said inner ring,
   said inner face on said inner ring in engagement with said seat,
   the cross section of said inner ring being relatively thick at its inner circumference and thin with respect to said inner circumference at its outer circumference,
   an outer frusto-conical circumferentially continuous metallic ring having a relatively low thermal coefficient of expansion compared to said inner ring,
   said outer ring having an inner face and an outer face,
   said inner face of said outer ring in engagement with the outer face of said inner ring and said outer face of said outer ring in engagement with said flared tube end,
   the cross section of said outer ring being relatively thick at its outer circumference and thin relative to its outer circumference adjacent its inner circumference and having a thickened section on its inner circumference engaging the inner circumferential edge of said inner ring,
   whereby tightening said coupling forces said flared tube end toward said seat compressing said inner and outer rings therebetween causing said outer ring to force said inner ring to move on the said seat and function as a ring spring.

4. In the flared tube coupling as claimed in claim 3 in which,
   said outer ring has a shoulder on its outer circumference engaging the outer surface of said seat.

5. In a flared tube coupling having a frusto-conical seat cooperating with a flared tube end and having screw means for assembling and forcing said flared tube end toward said seat,
  a seal between said seat and said flared tube end comprising a central circumferentially continuous metallic ring having a high thermal coefficient of expansion,
  a first face and a second face on said central ring,
  said first face on said central ring in engagement with said seat and said second face of said central ring in engagement with said flared tube end,
  inner and outer circumferentially continuous metallic rings having thermal coefficients of expansions similar to that of said coupling and lower than that of said central ring,
  each of said inner and outer metallic rings having first and second faces,
  said first faces of said inner and outer rings in engagement with said seat and said second faces of said inner and outer rings in engagement with said flared tube end,
  said inner and outer rings abutting against said central ring forming interfaces therebetween,
  and said interfaces being angularly disposed with respect to the axis of said coupling.

References Cited

UNITED STATES PATENTS

| | | | |
|---|---|---|---|
| 448,717 | 3/1891 | Hogan | 285—334.5 X |
| 1,662,954 | 3/1928 | Broido | 285—334.5 X |
| 1,880,638 | 10/1932 | Wood et al. | 285—334.5 |
| 2,312,909 | 3/1943 | Jeffery | 285—187 |
| 2,351,362 | 6/1944 | Parker | 285—334.5 X |
| 2,547,889 | 4/1951 | Richardson | 285—334.5 X |
| 2,766,829 | 10/1956 | Watts et al. | 285—140 X |
| 3,056,615 | 10/1962 | Breitenstein | 285—187 |
| 3,210,098 | 10/1965 | Watts | 285—173 |

FOREIGN PATENTS 738,907    9/1943    Germany.

CARL W. TOMLIN, *Primary Examiner.*

DAVE W. AROLA, *Assistant Examiner.*